United States Patent [19]

Bertrand

[11] Patent Number: 5,150,410
[45] Date of Patent: Sep. 22, 1992

US005150410A

[54] SECURE DIGITAL CONFERENCING SYSTEM
[75] Inventor: John Bertrand, Upper Nyack, N.Y.
[73] Assignee: ITT Corporation, New York, N.Y.
[21] Appl. No.: 684,688
[22] Filed: Apr. 11, 1991
[51] Int. Cl.$^5$ ............ H04K 1/00; H04Q 11/04; H04B 3/36; H04M 3/42
[52] U.S. Cl. .................... 380/28; 370/62; 375/3; 379/202
[58] Field of Search .......... 380/28; 379/202; 370/62; 375/3

[56] References Cited

U.S. PATENT DOCUMENTS

| | | | |
|---|---|---|---|
| 4,215,247 | 7/1980 | Lambert | 370/62 |
| 4,899,385 | 2/1990 | Ketchum et al. | 381/38 |
| 5,020,098 | 5/1991 | Celli | 379/202 |

Primary Examiner—Stephen C. Buczinski
Attorney, Agent, or Firm—Arthur L. Plevy

[57] ABSTRACT

A secure narrowband digital conferencing system is capable of handing multiple speakers simultaneously and in a full duplex mode. The system uses a multipulse or a code-excited linear predictive (CELP) speech processing algorithm for colding the speech signals of the respective participants. A conference director receives the multipluse or CELP encrypted voice signal streams over normal telephone links, decrypts them, then synthesizes a composite speech signal and uses an analysis-by-synthesis algorithm to compress them, and then encrypts the composite signal and transmits it back to all the participants.

6 Claims, 6 Drawing Sheets

SECURE DIGITAL CONFERENCING SYSTEM

FIELD OF INVENTION

The present invention relates to secure conferencing in which a plurality of speaker sources can communicate among each other through encoded digital transmission on telephone lines, and particularly, to secure narrowband digital conferencing in which multiple speakers can communicate simultaneously in full-duplex mode.

BACKGROUND OF INVENTION

Traditional telephone systems provide conferencing capability by connecting lines for the conference participants to the conference director's line (usually the PBX). If multiple speakers speak simultaneously, their analog voice signals are summed and transmitted to the participants. This cannot be done in the case of narrowband digital voice transmission which requires voice signal compression. In the latter case, voice signal compression is achieved through the use of a linear predictive coding (LPC) model of speech processing that corresponds to a single speaker. This model cannot handle multiple speakers simultaneously. Therefore, secure narrowband digital conferencing can only be achieved through the use of a conference director that enforces the single-speaker requirement.

Narrowband digital speech processing is widely used for secure voice communication. Although this approach has been very successful in point-to-point communication, it presents many problems in secure conferencing because of the single-speaker requirement. That is, only one speaker at a time can communicate through the conference director, that is controlled by a conference chairman. All communication requests must be routed through the conference director that must then designate the current active speaker. This single-speaker mode is quite awkward because it supports only half-duplex communication with large delays between successive communications.

As illustrated in FIG. 1, the conference director contains essentially a multiplicity of voice terminals that are connected to the participants P1, P2, . . . , PN over a full-duplex link. Each participant communicates by sending a digital speech signal which is encoded using the LPC method and encrypted for security reasons. Since the LPC coding can only handle a single-speaker speech signal, the conference director must control communications via a multiplexer MPX that designates, under the direction of the conference chairman, the currently active speaker. The designated speaker's speech is then appropriately encrypted and transmitted to the other participants.

Special escape sequences can be sent by the participants to the conference director to indicate that they wish to speak. The conference director relays the requests to the conference chairman. This can be done by a "data-over-voice" scheme that takes advantage of silences or by replacing an occasional voice frame sent to the chairman with a status frame.

The traditional system is, therefore, by design capable of operating only in a half-duplex mode. Participants must be well disciplined, since a request to be heard may or may not be honored at the discretion of the chairman. Finally, the required signallings between participants, conference director, and chairman add another layer of complexity.

SUMMARY OF INVENTION

It is therefore a principal object of the invention to provide a secure narrowband digital conferencing system which is capable of handling multiple speakers simultaneously and in a full duplex mode.

In accordance with the invention, a secure digital conferencing system employs a multipulse or a code-excited linear predictive (CELP) speech processing algorithm for coding the speech signals of respective participants. The conference director receives the multipulse or CELP encrypted voice signal streams over normal telephone links, decrypts them, then synthesizes a composite speech signal using an analysis-by-synthesis algorithm to compress them, and then encrypts the composite signal and transmits it back to all participants.

BRIEF DESCRIPTION OF DRAWINGS

The above objects and further features and advantages of the invention are described in detail below in conjunction with the drawings, of which.

DETAILED DESCRIPTION OF PREFERRED EMBODIMENTS

The proposed secure conferencing system and method of the invention employs one of the recently developed analysis-by-synthesis techniques, such as multipulse or CELP encoding, as the voice processing algorithm. Although these schemes are based on linear predictive coding (LPC), they do not depend on the parts of LPC that completely break down in the multiple speaker case. The excitation signal estimated by these techniques can also make up, to a certain extent, errors in the spectral envelope that are due to the LPC constraints.

Figure 2:
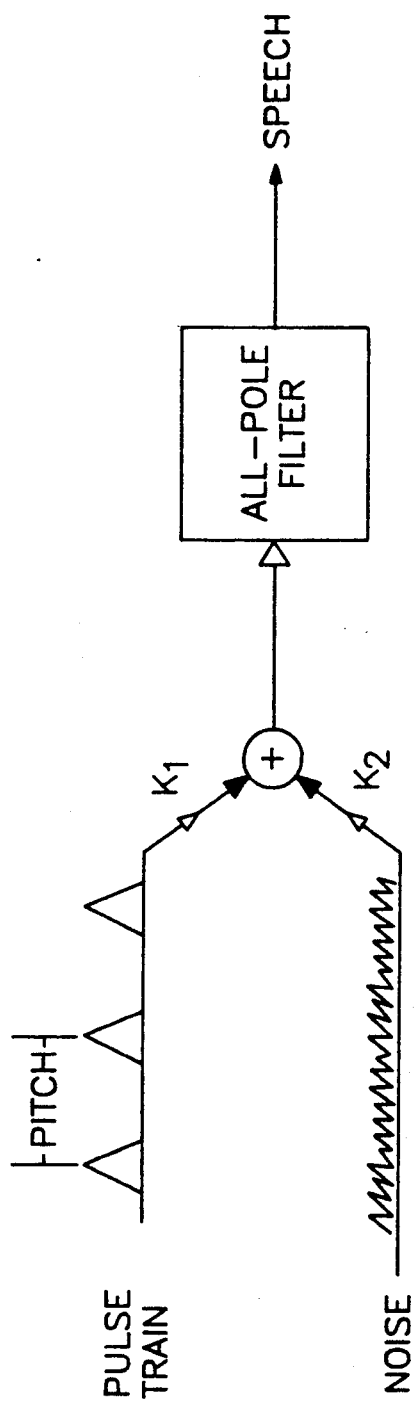
FIG. 2 illustrates a conventional model of linear predictive coding (LPC)

LPC is based on the speech generation model shown in FIG. 2. According to this model, an all-pole linear system is excited by the sum of a periodic pulse train and noise appropriately weighted. The amplitude of the pulses and the noise depend on the speaker volume. The period of the pulse train is equal to the pitch of the speaker. In the case of multiple speakers, no single pitch exists and the true excitation consists of multiple pulse trains with different periods and amplitudes. Thus, this model is inherently a single-speaker model and can not handle multiple speakers.

In contrast to LPC, the analysis-by-synthesis methods do not enforce the rigid excitation scheme used by LPC. Instead, they estimate an excitation signal that minimizes the error between the original and synthetic speech according to certain selected criteria. In the single-speaker case, the analysis-by-synthesis methods yield an encoded signal which looks similar to the LPC excitation mode (a periodic pulse train). In the presence of multiple speakers, however, this excitation is not constrained to that form and, for that reason, can adequately model the speech of multiple speakers.

Figure 3:
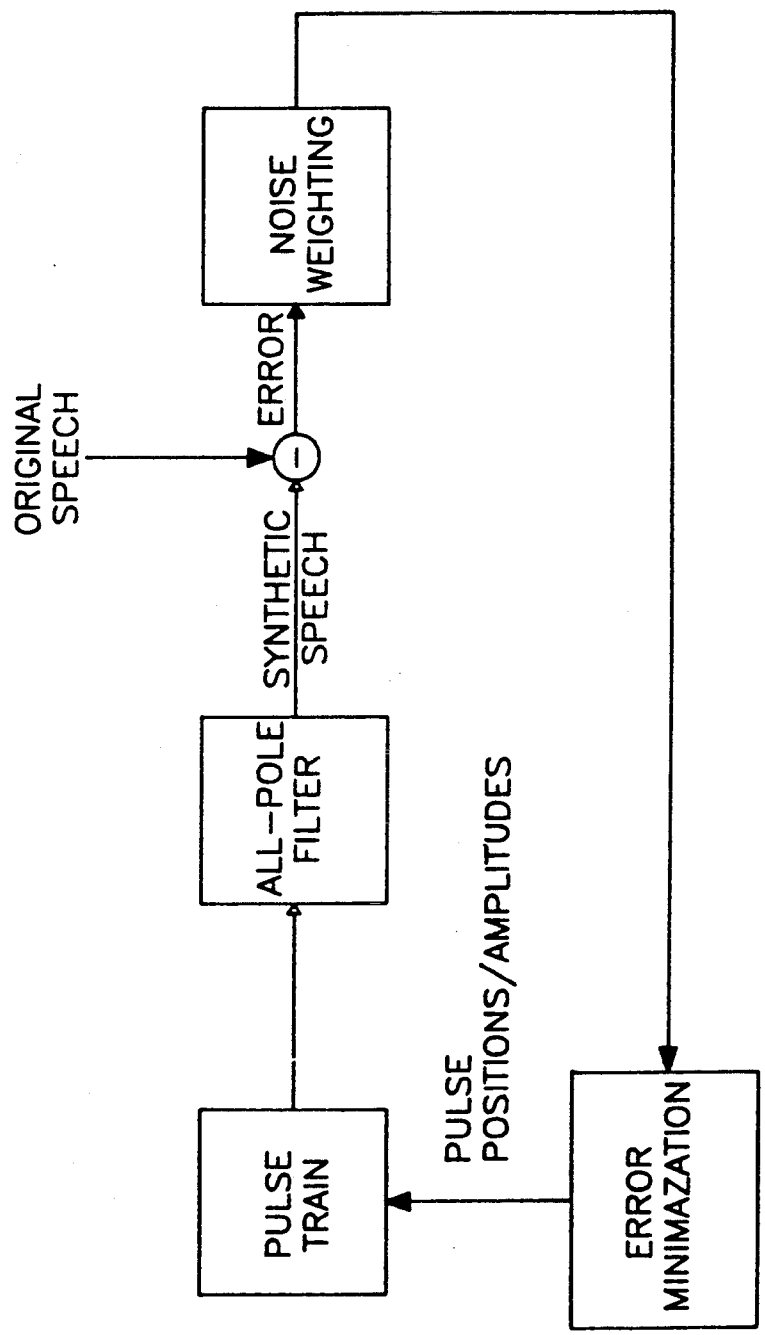
FIG. 3 is a schematic diagram of a secure telephone conferencing system in accordance with the invention and showing the basic encoding process for a multipulse.

Multipulse, as an analysis-by-synthesis method, assumes that speech is generated by an all-pole system, just like LPC. The excitation, however, is completely different. The excitation of multipulse is a sequence of pulses. The position and amplitude of the pulses is estimated by minimizing, in the mean square sense, the noise-weighted error between the synthetic speech and the original speech, as shown in FIG. 3. Since the excitation does not impose the strict periodicity of LPC's pulse train, it can accommodate multiple speakers.

Further description of the multipulse speech processing method is provided in "A New Model of LPC Excitation for Producing Natural-Sounding Speech at Low Bit Rates", by B. S. Atal and J. R. Remde, Proc. ICASSP, 1982, Paris, which is incorporated herein by reference.

Figure 4A:
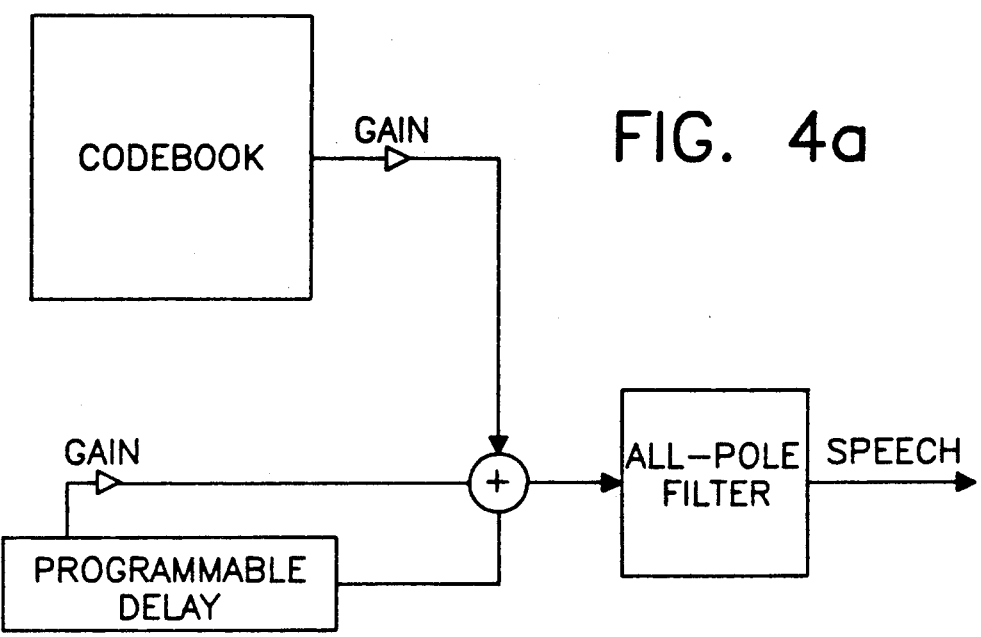
FIGS. 4a and 4b are schematic diagrams of a secure telephone conferencing system in accordance with the invention and showing the basic encoding process for a code-excited linear prediction (CELP)
Figure 4B:
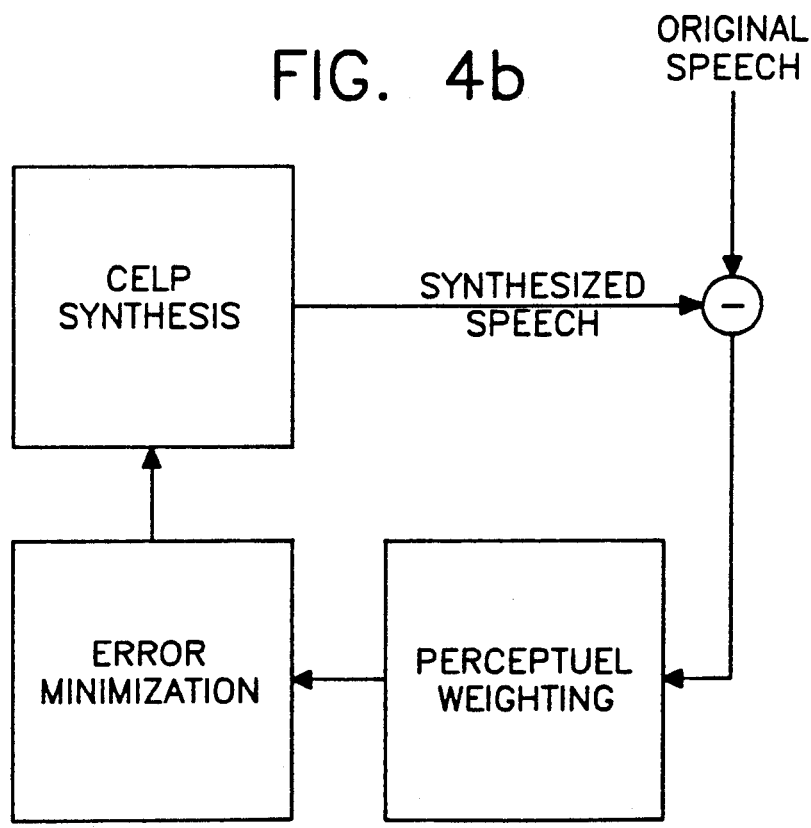

Code-Excited Linear Prediction (CELP), another analysis-by-synthesis method which represents a further refinement to multipulse, is shown in FIGS. 4a and 4b. In addition to removing long term periodicities associated with the all-pole filter of LPC and multipulse, it also removes short-term periodicities with a programmable delay loop, as shown in FIG. 4a. The fact that the excitation is again estimated by an error minimization allows CELP to handle multiple speakers.

Further description of the CELP speech processing method is provided in "Stochastic Coding of Speech at Very Low Bit Rates", by B. S. Atal and M. Schroeder, Proc. ICC, 1984, and "An Expandable Error-Protected 4800 bps CELP Coder", by J. P. Campbell, V. C. Welch, and T. E. Tremain, Proc. ICASSP, 1989, which are incorporated herein by reference.

Figure 5:
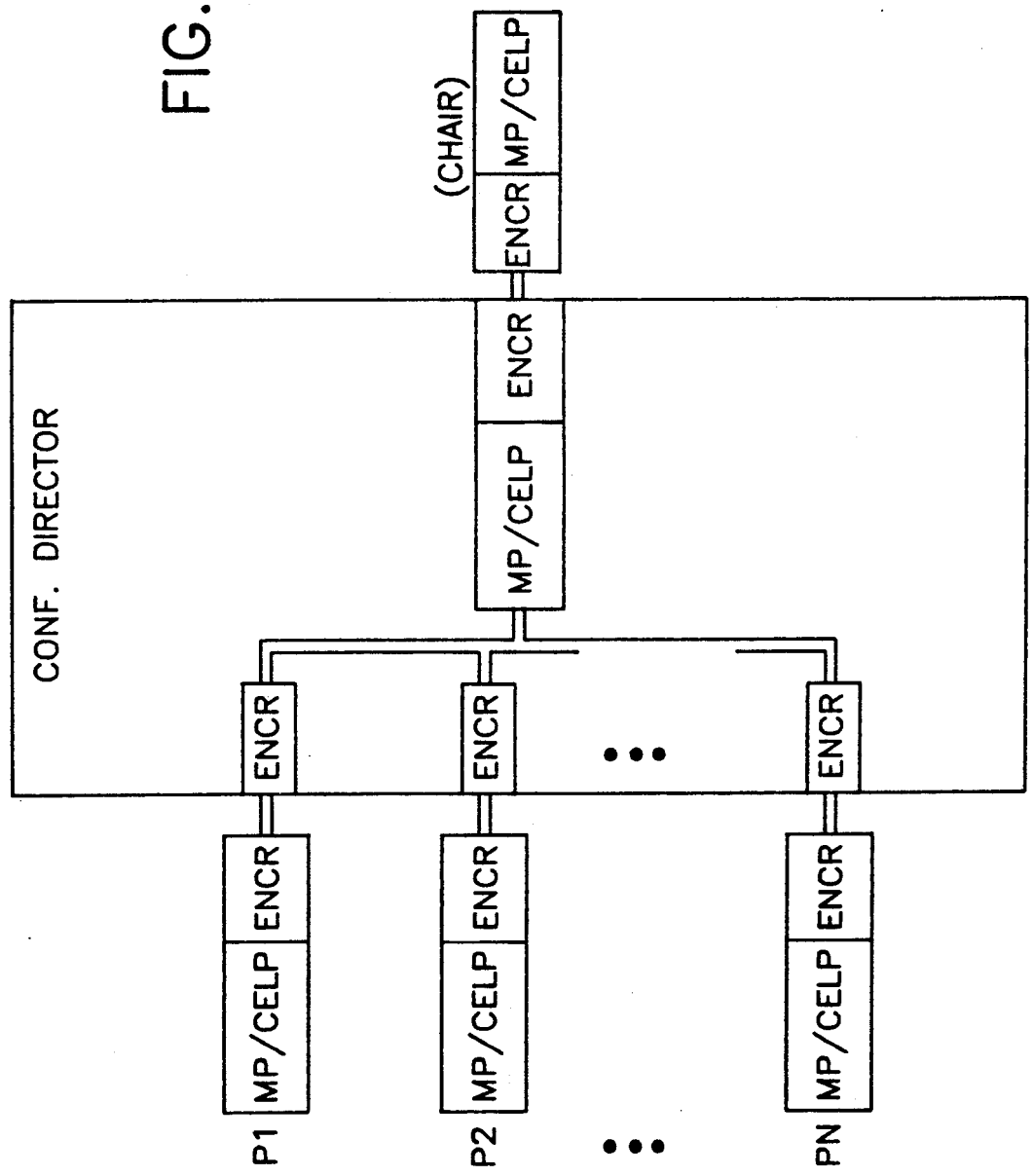
FIG. 5 is a schematic diagram of a logic sequence for the director's combining and analysis of the speech signal streams for transmission to the participants.
Figure 6:
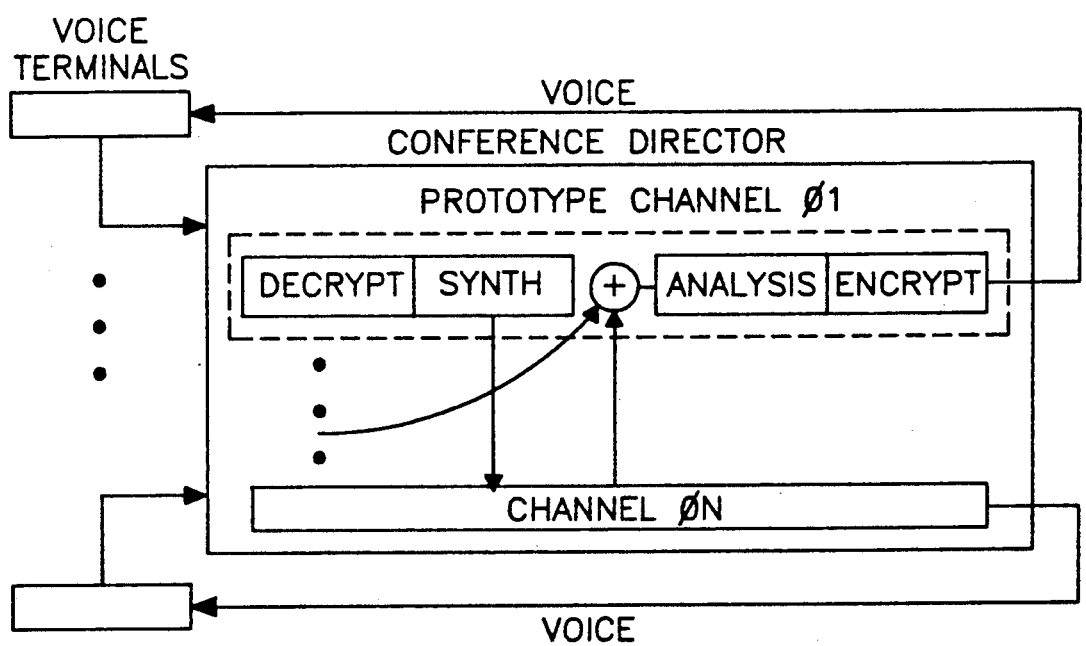
FIG. 6 is a block diagram of the secure digital conferencing system.

Referring to FIG. 5, a secure narrowband digital conferencing system in accordance with the invention employs the multipulse or CELP speech processing algorithm for coding the speech signals of the respective participants, P1, p2, . . . PN. Thus, each participant's terminal includes a multipulse (MP) or CELP coder, and an encryption/decryption ENCR module for secure transmission. The participants are connected to the conference director 20 over normal FDX (full-duplex) links. The director receives the multipulse or CELP encrypted voice signal streams, decrypts them, then synthesizes a composite speech signal and uses an analysis-by-synthesis (multipulse or CELP) algorithm to compress them, encrypts the composite signal, and transmits it back to all participants.

Figure 1:
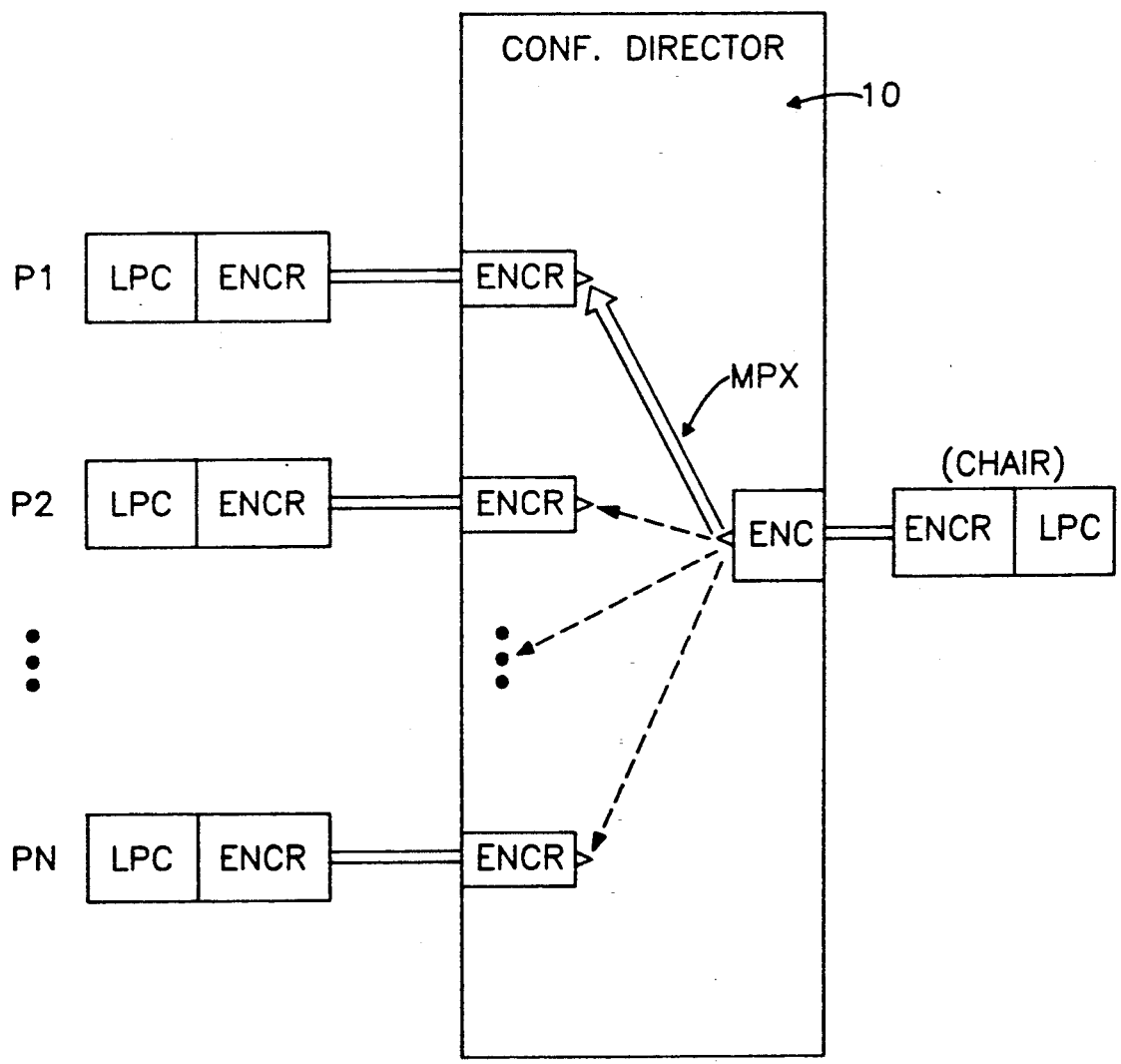
FIG. 1 illustrates a conventional secure telephone conferencing system.

Compared to the system of FIG. 1, the operation of the conference director in the system of FIG. 5 is quite different. The director again contains multiple voice terminals and is connected by full duplex links with all participants. However, the speech signal streams are received from the participants and decrypted in multipulse or CELP coded form. Therefore, these MP/CELP speech signals can be added together, and the resulting speech can be analyzed by the director and transmitted back to all participant's terminals. Each director terminal excludes its own reception from the combined speech signal that is analyzed. Otherwise, a significantly delayed echo signal would be produced.

The Director's combining and analysis of the speech signals is shown in FIG. 5. The secure conferencing system can support full duplex unsupervised conferencing. The standard signalling between stand-alone terminals is sufficient to establish the required communication links. Changing to the conference mode, such as pre-programmed mode and add-on speaker, requires no special signalling since, as far as any participant's terminal is concerned, the participant's terminal is only connected to the director's terminal via the full duplex link. The system can easily be employed in existing secure telephone networks without any modifications of the deployed terminals. As far as the terminals are concerned, the standard signalling and call setup methods still prevail since even a conference looks like a point-to-point connection.

The new system imposes a greater computational requirement on the director's terminal. Each channel in the conference director is a complete voice terminal which includes voice processing. However, more powerful digital signal processors, such as the Intel i860, make this implementation feasible with a small number of processors, e.g., one processor per channel. The availability of high computational throughput means that the only requirements are additional programming and data memory which have little impact on the overall system's size and cost.

Preliminary tests indicate that the multipulse encoding performs well for at least three speakers simultaneously. Speech samples for three speakers were synthesized together to create a multispeaker speech signal which was transmitted and decoded with excellent results. Similar results for the performance of the system using CELP encoding were obtained.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

I claim:

1. A secure digital conferencing system comprising:
   a plurality of digital voice signal encoding terminals each employing a multipulse or a code-excited linear predictive (CELP) speech processing module for encoding speech signals of respective conference participants in multipulse or CELP form;
   a director terminal having receiving means for receiving the multipulse or CELP encoded signal streams from said plurality of voice signal encoding terminals, synthesizing means employing a multipulse or a code-excited linear predictive (CELP) speech processing module for synthesizing a combined speech signal from the received encoded signal streams, and analyzing means employing multipulse or CELP for analysis of the composite signal and for transmission back to said plurality of participants' voice signal encoding terminals.

2. The system according to claim 1, wherein excitation of said multipulse signal stream is a sequence of a plurality of pulses, each one of said plurality of pulses having its position and amplitude estimated by minimizing any noise-weighted error occurring between original speech and a synthesized combined speech signal such that said excitation permits said sequence of pulses to accommodate said multipulse encoded signal streams from said plurality of voice signal encoding terminals.

3. The system according to claim 1, wherein excitation of said code-excited linear predictive (CELP) signal stream is a sequence of a plurality of pulses, each one of said plurality of pulses having its position and amplitude estimated by minimizing any noise-weighted error occurring between said original speech and said synthesized combined speech signal, and wherein a programmable delay loop removes any short-term periodicities of said pulses such that said excitation permits said sequence of pulses to accommodate said CELP encoded signal streams from said plurality of voice signal encoding terminals.

4. In a secure digital conferencing system, a method for handling multiple speakers simultaneously and in a full duplex mode, the method comprising the steps of:

directing signal streams of respective participants to a director terminal;

decrypting said signal streams at said director terminal;

synthesizing said signal streams into a composite speech signal and employing an analysis-by-synthesis algorithm to compress said signal streams;

encrypting said composite speech signal; and transmitting said composite speech signal back to said respective participants.

5. The method according to claim 4, wherein said analysis-by-synthesis algorithm employs a multipulse speech processing algorithm.

6. The method according to claim 4, wherein said analysis-by-synthesis algorithm employs a code-excited linear predictive (CELP) speech processing algorithm.

* * * * *